(12) United States Patent
Piazza et al.

(10) Patent No.: US 7,414,632 B1
(45) Date of Patent: Aug. 19, 2008

(54) MULTI-PASS 4:2:0 SUBPICTURE BLENDING

(75) Inventors: Thomas Piazza, Granite Bay, CA (US); Val G. Cook, Shingle Springs, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/478,999

(22) Filed: Jan. 7, 2000

(51) Int. Cl.
*G09G 5/02* (2006.01)
*G09G 5/00* (2006.01)

(52) U.S. Cl. .................................. 345/592; 345/629

(58) Field of Classification Search ................ 345/592, 345/629
See application file for complete search history.

(56) References Cited

U.S. PATENT DOCUMENTS

| 5,642,137 A | 6/1997 | Kitazumi ..................... 345/605 |
| 5,651,104 A | 7/1997 | Cosman ....................... 345/428 |
| 5,734,802 A | 3/1998 | Maltz et al. .................. 358/1.9 |
| 5,852,444 A | 12/1998 | Lippincott ................... 345/603 |
| 5,896,136 A | 4/1999 | Augustine et al. ........... 345/605 |
| 6,208,350 B1 * | 3/2001 | Herrera ....................... 345/582 |
| 6,678,006 B1 * | 1/2004 | Velez et al. ................. 348/564 |

FOREIGN PATENT DOCUMENTS

EP  9923831  5/1999

* cited by examiner

*Primary Examiner*—Motilewa Good-Johnson
(74) *Attorney, Agent, or Firm*—Molly A. McCall

(57) ABSTRACT

A circuit for blending video signals and subpicture signals is provided. The circuit includes a palette to output at least one subpicture value based on a palette index. The circuit also includes an alpha-blend unit coupled to the subpicture palette to blend a set of luminance values of a video signal with a set of luminance values of a subpicture signal in one pass and to blend a set of chrominance values of a video signal with a set of chrominance values of the subpicture signal in a separate pass, the luminance and chrominance values are provided to the alpha-blend unit in a planar format. The video signals may be provided and blended in a YUV 4:2:0 format. In addition, a single dual-purpose palette can be used for both texturing and alpha-blending.

20 Claims, 9 Drawing Sheets

MULTI-PASS 4:2:0 SUBPICTURE BLENDING

| Decimal Index | Palette Index | Values | | |
|---|---|---|---|---|
| | | Y | Cr | Cb |
| 0 | 0000 | Y0 | Cr0 | Cb0 |
| 1 | 0001 | Y1 | Cr1 | Cb1 |
| 2 | 0010 | Y2 | Cr2 | Cb2 |
| 3 | 0011 | Y3 | Cr3 | Cb3 |
| 4 | 0100 | Y4 | Cr4 | Cb4 |
| 5 | 0101 | Y5 | Cr5 | Cb5 |
| 6 | 0110 | Y6 | Cr6 | Cb6 |
| 7 | 0111 | Y7 | Cr7 | Cb7 |
| 8 | 1100 | Y8 | Cr8 | Cb8 |
| 9 | 1001 | Y9 | Cr9 | Cb9 |
| 10 | 1010 | Y10 | Cr10 | Cb10 |
| 11 | 1011 | Y11 | Cr11 | Cb11 |
| 12 | 1100 | Y12 | Cr12 | Cb12 |
| 13 | 1101 | Y13 | Cr13 | Cb13 |
| 14 | 1110 | Y14 | Cr14 | Cb14 |
| 15 | 1111 | Y15 | Cr15 | Cb15 |

157 Subpicture Palette

Fig. 5

| Decimal Index | Palette Index | | Palette Values | |
|---|---|---|---|---|
| | Nat. Index + Nat. Alpha | | New Alpha + Y/Cr/Cb | |
| 0 | 0000 | 0000 | 00000000 | Y0 |
| 1 | 0000 | 0001 | 00010001 | Y0 |
| 2 | 0000 | 0010 | 00100010 | Y0 |
| 3 | 0000 | 0011 | 00110011 | Y0 |
| 4 | 0000 | 0100 | 01000100 | Y0 |
| 5 | 0000 | 0101 | 01010101 | Y0 |
| 6 | 0000 | 0110 | 01100110 | Y0 |
| 7 | 0000 | 0111 | 01110111 | Y0 |
| 8 | 0000 | 1000 | 10001000 | Y0 |
| 9 | 0000 | 1001 | 10011001 | Y0 |
| 10 | 0000 | 1010 | 10101010 | Y0 |
| 11 | 0000 | 1011 | 10111011 | Y0 |
| 12 | 0000 | 1100 | 11001100 | Y0 |
| 13 | 0000 | 1101 | 11011101 | Y0 |
| 14 | 0000 | 1110 | 11101110 | Y0 |
| 15 | 0000 | 1111 | 11111111 | Y0 |
| 16 | 0001 | 0000 | 00000000 | Y1 |
| 17 | 0001 | 0001 | 00010001 | Y1 |
| 18 | 0001 | 0010 | 00100010 | Y1 |
| 19 | 0001 | 0011 | 00110011 | Y1 |
| 20 | 0001 | 0100 | 01000100 | Y1 |
| 21 | 0001 | 0101 | 01010101 | Y1 |
| 22 | 0001 | 0110 | 01100110 | Y1 |
| ... | ... | ... | ... | ... |
| 253 | 1111 | 1101 | 11011101 | Y15 |
| 254 | 1111 | 1110 | 11101110 | Y15 |
| 255 | 1111 | 1111 | 11111111 | Y15 |

A Texture Palette Loaded to Operate As A Subpicture Palette

Fig. 9

ABSTRACT

MULTI-PASS 4:2:0 SUBPICTURE BLENDING

FIELD

The present invention is directed to computers, and more particularly, to subpicture blending.

BACKGROUND

The process of blending (also known as compositing or image compositing) a subpicture with a destination image typically requires up-sampling the destination image to either the 4:2:2 format or the 4:4:4 format and alpha-blending the subpicture. Video decoders have usually performed this operation in the display or overlay hardware in interleaved 4:2:2 format at video refresh rates (such as 75-85 Hz). While providing excellent results and quality, this approach is costly in terms of gates and also requires significantly more memory bandwidth. This is due to the up-sampling to 4:2:2 or 4:4:4 and performing the operation at the higher display rate. This is especially problematic in the highly price-competitive personal computer (PC) market.

Therefore, there is a need for a less expensive technique for performing subpicture blending.

SUMMARY

According to an embodiment, a circuit for blending video signals and subpicture signals is provided. The circuit includes a palette to output at least one subpicture value based on a palette index. The circuit also includes an alpha-blend unit coupled to the subpicture palette to blend a set of luminance values of a video signal with a set of luminance values of a subpicture signal in one pass and to blend a set of chrominance values of the video signal with a set of chrominance values of the subpicture signal in a separate pass. The luminance and chrominance values of the video signal are provided to the alpha-blend unit in a planar format.

BRIEF DESCRIPTION OF THE DRAWINGS

The foregoing and a better understanding of the present invention will become apparent from the following detailed description of exemplary embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and is not limited thereto. The spirit and scope of the present invention being limited only by the terms of the appended claims.

The following represents brief descriptions of the drawings, wherein:

FIG. 5 is a diagram illustrating a subpicture palette according to an example embodiment.

FIG. 9 is a diagram illustrating operation of the texture palette as a subpicture palette according to an example embodiment.

DETAILED DESCRIPTION

I. Introduction

The emergence of Digital Versatile Disk (DVD) (also known as Digital Video Disk) has allowed personal computer (PC) manufacturers to provide a more effective multimedia PC for delivering video and audio information to users. It also presents a significant technical challenge in the highly price-competitive PC market to provide PCs capable of providing high performance video and audio while maintaining a low cost.

A DVD data stream can contain several types of packetized streams, including video, audio, subpicture, presentation and control information, and data search information (DSI). DVD supports up to 32 subpicture streams that overlay the video to provide subtitles, captions, karaoke, lyrics, menus, simple animation and other graphical overlays. According to the DVD specification, the subpictures are intended to be blended with the video for a translucent overlay in the final digital video signal.

Figure 1:
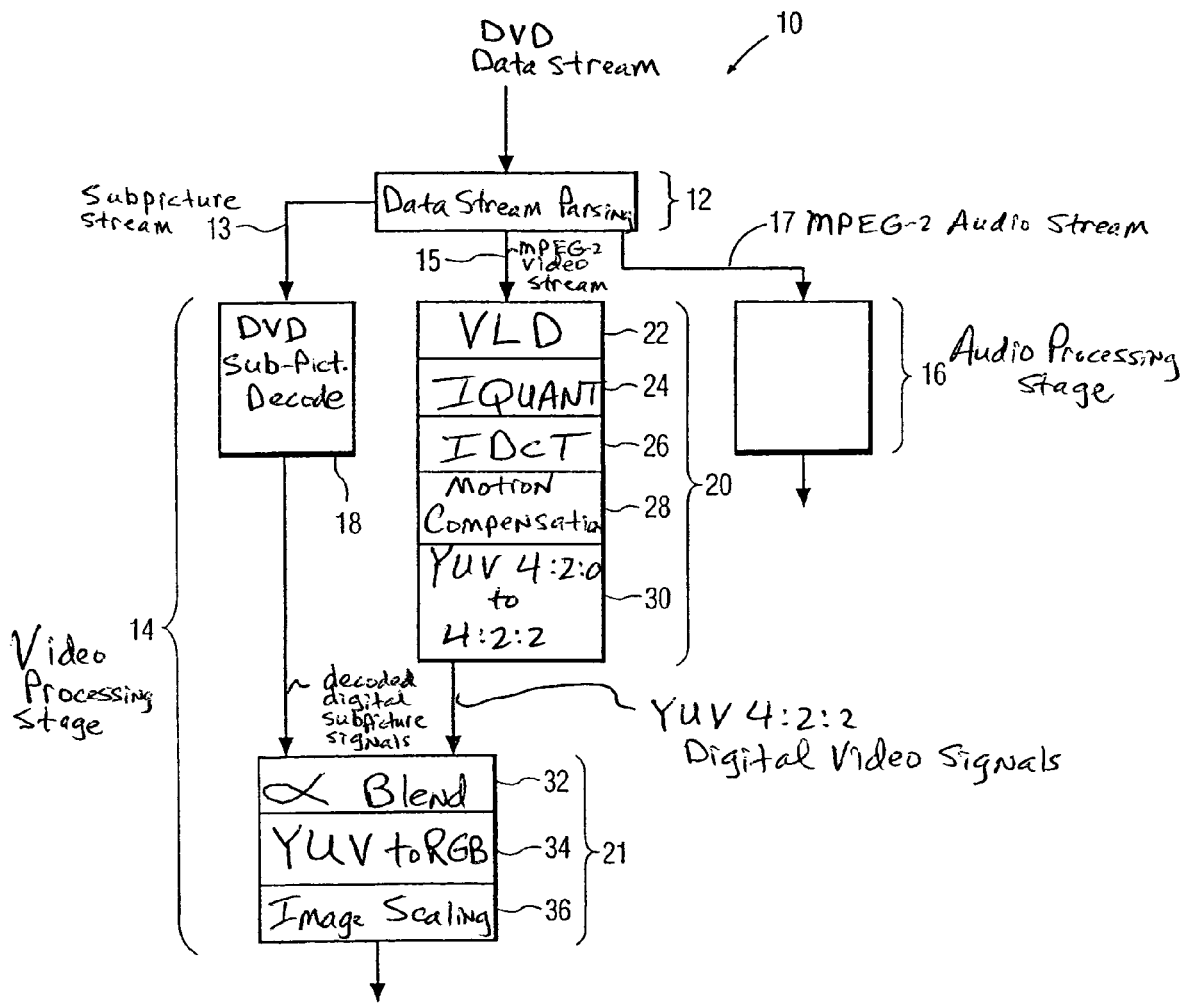
FIG. 1 is a block diagram illustrating a typical DVD data stream processing pipeline 10.

FIG. 1 is a block diagram illustrating a typical DVD data stream processing pipeline 10. The video and audio streams are compressed according to the Moving Pictures Experts Group MPEG-2 standard. Additional information regarding the DVD processing can be found in the DVD Specification, Version 1.0, August, 1996; and additional information regarding the MPEG-2 standard can be found, for example, in MPEG Video Standard: ISO/IEC 13818-2: Information Technology—Generic Coding of Moving Pictures and Associated Audio Information: Video (1996) (a.k.a. ITU-T Rec. H-262 (1996)). A discussion of a typical DVD data stream processing is also provided in published PCT application No. WO 99/23831.

Referring to FIG. 1 again, in data stream parsing stage 12, an incoming DVD data stream is parsed or split (i.e., demultiplexed) into multiple independent streams, including a subpicture stream 13, a MPEG-2 video stream 15 and a MPEG-2 audio stream 17. The MPEG-2 video stream 15 and the subpicture stream 13 are provided to a video processing stage 14. Similarly, the MPEG-2 audio stream is provided to an audio processing stage 16.

Video processing stage 14, as depicted in FIG. 1, may include three sub-stages (sub-stages 18, 20 and 21). The first sub-stage is a DVD subpicture decode stage 18 in which the subpicture stream is decoded into a two-dimensional array of subpicture values. Each subpicture value includes an index into a subpicture palette a and a corresponding alpha value. The indices identify Y, U and V values of the subpicture pixels. The alpha values are used for blending or image compositing the subpicture signal and the video signal. As a result, the subpicture data may be considered as being provided in a YUV 4:4:4 format (the palette contains the YUV 4:4:4 values or color codes for the subpicture signal). YUV is a color-difference video signal containing one luminance value (Y) or component and two chrominance values (U, V) or components, and is also commonly referred to as YCrCb (where Cr and Cb are chrominance values corresponding to U and V). The terms YUV and YCrCb will be used interchangeably herein. YUV 4:4:4 is a component digital video format in which each of the luminance and chrominance values are sampled equally (e.g., one Y value, one U value and one V value per pixel).

The second sub-stage of video processing stage 14 is an MPEG-2 video decode sub-stage 20 in which the MPEG-2 video stream is decoded and decompressed and converted to a YUV 4:2:2 digital video signal. The incoming DVD video signals in the DVD data stream are decoded into a planar YUV 4:2:0 format. In accordance with the MPEG-2 specification, MPEG-2 decode sub-stage stage 20 then conducts a variable length decode (VLD) 22, an inverse quantization (IQUANT) 24, an Inverse Discrete Cosine Transform (IDCT) 26 and motion compensation 28.

As noted, the incoming DVD video signals in the DVD data stream are decoded into a planar YUV 4:2:0 format. Also, YUV 4:2:0 is the digital component format used to perform the MPEG-2 motion compensation, stage 28. However, a subsequent alpha-blending stage 32 is typically performed in YUV 4:2:2 format. Therefore, after motion compensation 28, a conversion stage 30 is used to convert the digital video data from a planar YUV 4:2:0 format to an interleaved (or packed) YUV 4:2:2 format.

The interleaved (or packed) format is where the Y, U and V samples are provided or stored in an interleaved arrangement (e.g., YUVYUVYUV . . . ). The planar format is where a group of Y samples (e.g., for a frame) are provided or stored together (typically contiguously) in a surface or set of buffers, a group of U samples are provided or stored together (typically contiguously) in a second surface or a second set of memory buffers, and the V samples are stored in a third surface or set of buffers. Thus, in the planar format, the sets of Y, U and V samples are stored in separate surfaces (or separate sets of buffers or separate regions in memory).

In YUV 4:2:2, there is one pair of chrominance samples (UV) for two luminance samples (e.g., chrominance samples U, V are shared across two pixels). This is done by a 2:1 horizontal downsampling of the YUV 4:4:4 chrominance samples. In YUV 4:2:0, there is both a horizontal 2:1 downsampling and a vertical 2:1 downsampling of the chrominance samples (UV). Thus, in YUV 4:2:0, one pair of chrominance samples (UV) are shared for four pixels (while each pixel includes its own luminance sample, Y).

The eye is more sensitive to brightness than color. As a result, rather than sampling the Y, U and V samples equally (as in YUV 4:4:4), a video frame can be compressed without a significant perceived loss in quality by compressing only the color or chrominance information (e.g., resulting in a 4:2:2 format, or even a 4:2:0 format). As a result, compression can be achieved by downsampling the chrominance samples horizontally (for a 4:2:2 format) or by downsampling the chrominance samples both horizontally and vertically (for the 4:2:0 format).

Referring to FIG. 1 again, the resulting YUV 4:2:2 decoded video signals are provided to a third sub-stage 21 where the YUV 4:2:2 video signals and the subpicture signals are blended together in an alpha blend process 32 (or image compositing process) to produce a video signal having a translucent overlay. Next the blended video signal is converted from YUV 4:2:2 to YUV 4:4:4 (not shown), and then provided to a YUV-to-RGB conversion process 34, in which the blended digital video signal is converted from a YUV 4:4:4 format to a (red-green-blue) RGB format, which is compatible with a cathode ray tube (CRT) display or other display. An image scaling process 36 may then be performed to scale the image to a particular size for display. The RGB signal may be converted to an analog signal if required by the display or receiving device. The scaled RGB signal is then provided to a display or provided to other devices for recording, etc.

The MPEG-2 motion compensation sub-stage 28 will be briefly discussed. MPEG-2 video performs image compression using motion compensation and motion estimation. Since motion video is a sequence of still pictures or frames, many of which are very similar, each picture can be compared to the pictures adjacent in time. The MPEG encoding process breaks each picture into regions, called macroblocks, then hunts around in neighboring pictures for similar blocks. Then instead of storing the entire block, the system stores a much smaller pointer called a motion vector describing how far the block has moved (or didn't move) between the pictures. In this manner, one block or even a large group of blocks that move together can be efficiently compressed.

MPEG-2 uses three kinds of pictures. Intra pictures (I frames) are pictures in which the entire picture is compressed and stored with DCT quantization. This I frame creates a reference frame from which successive pictures are built. Predicted pictures (P frames) contain motion vectors describing the difference from the closest I frame or P frame. If the frame has changed slightly in intensity (luminance) or color (chrominance), then this difference is also encoded. If something new appears which doesn't match previous blocks, a new block is stored in the same way an I frame is stored. Thus, P frames also operate as reference frames for building additional frames. A third type of frame is a bidirectional picture (B frame), where the system looks forward and backward to match blocks to the closest I frame and/or P frame. B frames do not function as reference frames.

The processing stages/substages associated with DVD processing pipeline 10 tend to be extremely compute intensive. In particular, the MPEG-2 decode stages, including the motion compensation 28, tend to be the most compute intensive stages. An important consideration for PC manufacturers in providing DVD capabilities is cost. Because the DVD processes are compute intensive, there is a need to provide cost-effective solutions that reduce the costs associated with the various stages and substages of the DVD processing pipeline. In a computer system, the processor typically executes software to perform some if not all of the DVD processing. While this may be relatively inexpensive because no specialized DVD hardware is necessary, such a solution can overburden the processor and results in a "jerky" frame rate or dropped frames which are very noticeable and generally considered unacceptable. As described below, according to an embodiment of the invention, one or more functions in the DVD pipeline can be performed in hardware to provide increased performance. As described below in detail, several new techniques are used to decrease hardware complexity and cost while maintaining adequate DVD quality and performance.

II. Overall System Architecture

Although example embodiments of the present invention will be described using an example system block diagram in an example personal computer (PC) system or environment, practice of the invention is not limited thereto, i.e., the invention may be practiced with other types of systems, and in other types of environments.

Figure 2:
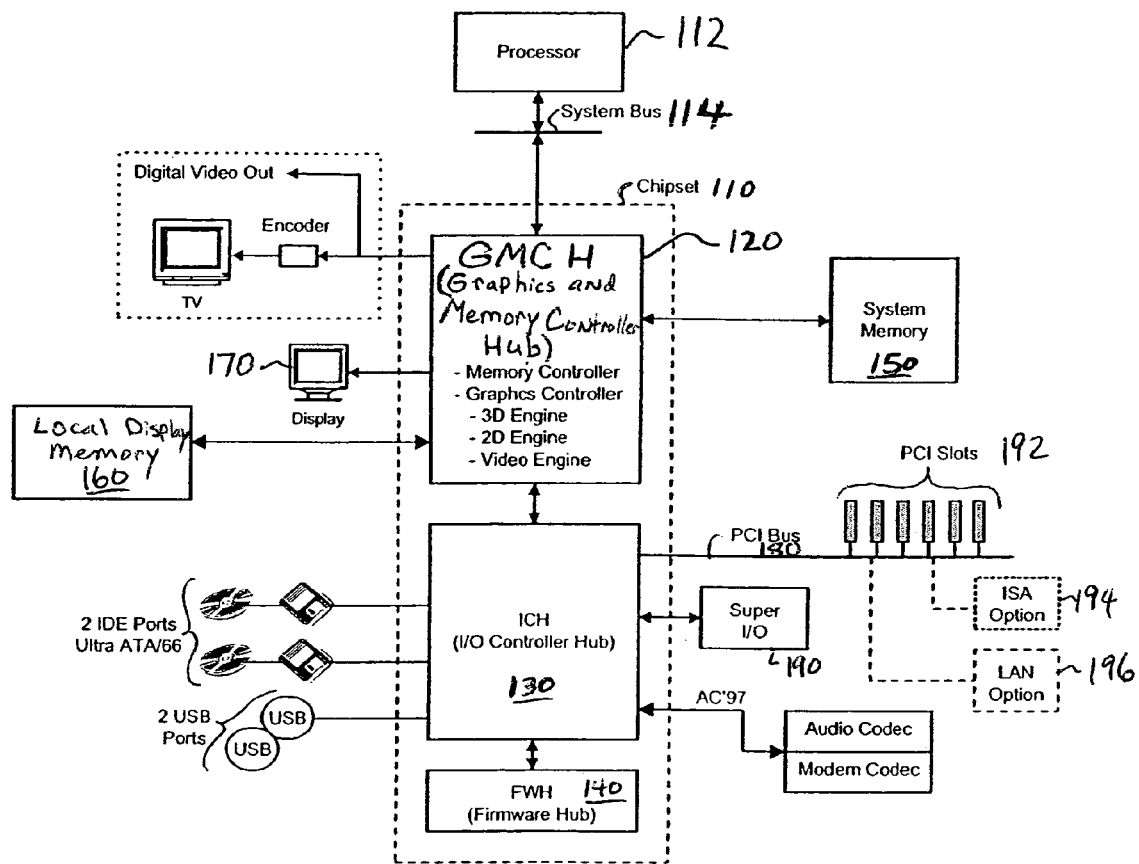
FIG. 2 is a block diagram illustrating an example personal computer (PC) system.

Referring to the Figures in which like numerals indicate like elements, FIG. 2 is a block diagram illustrating an example personal computer (PC) system. Included within such system may be a processor 112 (e.g., an Intel® Celeron® processor) connected to a system bus 114. A chipset 110 is also connected to system bus 114. Although only one processor 112 is shown, multiple processors may be connected to system bus 114. In an example embodiment, the chipset 110 may be a highly-integrated three-chip solution including a graphics and memory controller hub (GMCH) 120, an input/output (I/O) controller hub(ICH) 130 and a firmware hub (FWH) 140.

The GMCH 120 provides graphics and video functions and interfaces one or more memory devices to the system bus 114. The GMCH 120 may include a memory controller as well as a graphics controller (which in turn may include a 3-dimensional (3D) engine, a 2-dimensional (2D) engine, and a video engine). GMCH 120 may be interconnected to any of a system memory 150, a local display memory 160, a display 170 (e.g., a computer monitor) and to a television (TV) via an encoder and a digital video output signal. GMCH 120 maybe, for example, an Intel® 82810 or 82810-DC100 chip. The GMCH 120 also operates as a bridge or interface for communications or signals sent between the processor 112 and one or more I/O devices which may be connected to ICH 140. As shown in FIG. 2, the GMCH 120 includes an integrated graphics controller and memory controller. However, the graphics controller and memory controller may be provided as separate components.

ICH 130 interfaces one or more I/O devices to GMCH 120. FWH 140 is connected to the ICH 130 and provides firmware for additional system control. The ICH 130 may be for example an Intel® 82801 chip and the FWH 140 may be for example an Intel® 82802 chip.

The ICH 130 may be connected to a variety of I/O devices and the like, such as: a Peripheral Component Interconnect (PCI) bus 180 (PCI Local Bus Specification Revision 2.2) which may have one or more I/O devices connected to PCI slots 192, an Industry Standard Architecture (ISA) bus option 194 and a local area network (LAN) option 196; a Super I/O chip 190 for connection to a mouse, keyboard and other peripheral devices (not shown); an audio coder/decoder (Codec) and modem Codec; a plurality of Universal Serial Bus (USB) ports (USB Specification, Revision 1.0); and a plurality of Ultra/66 AT Attachment (ATA) 2 ports (X3T9.2 948D specification; commonly also known as Integrated Drive Electronics (IDE) ports) for receiving one or more magnetic hard disk drives or other I/O devices.

One or more speakers are typically connected to the computer system for outputting sounds or audio information (speech, music, etc.). According to an embodiment, a compact disc(CD) player or preferably a Digital Video Disc (DVD) player is connected to the ICH 130 via one of the I/O ports (e.g., IDE ports, USB ports, PCI slots). The DVD player uses information encoded on a DVD disc to provide digital audio and video data streams and other information to allow the computer system to display and output a movie or other multimedia (e.g., audio and video) presentation.

Figure 3:
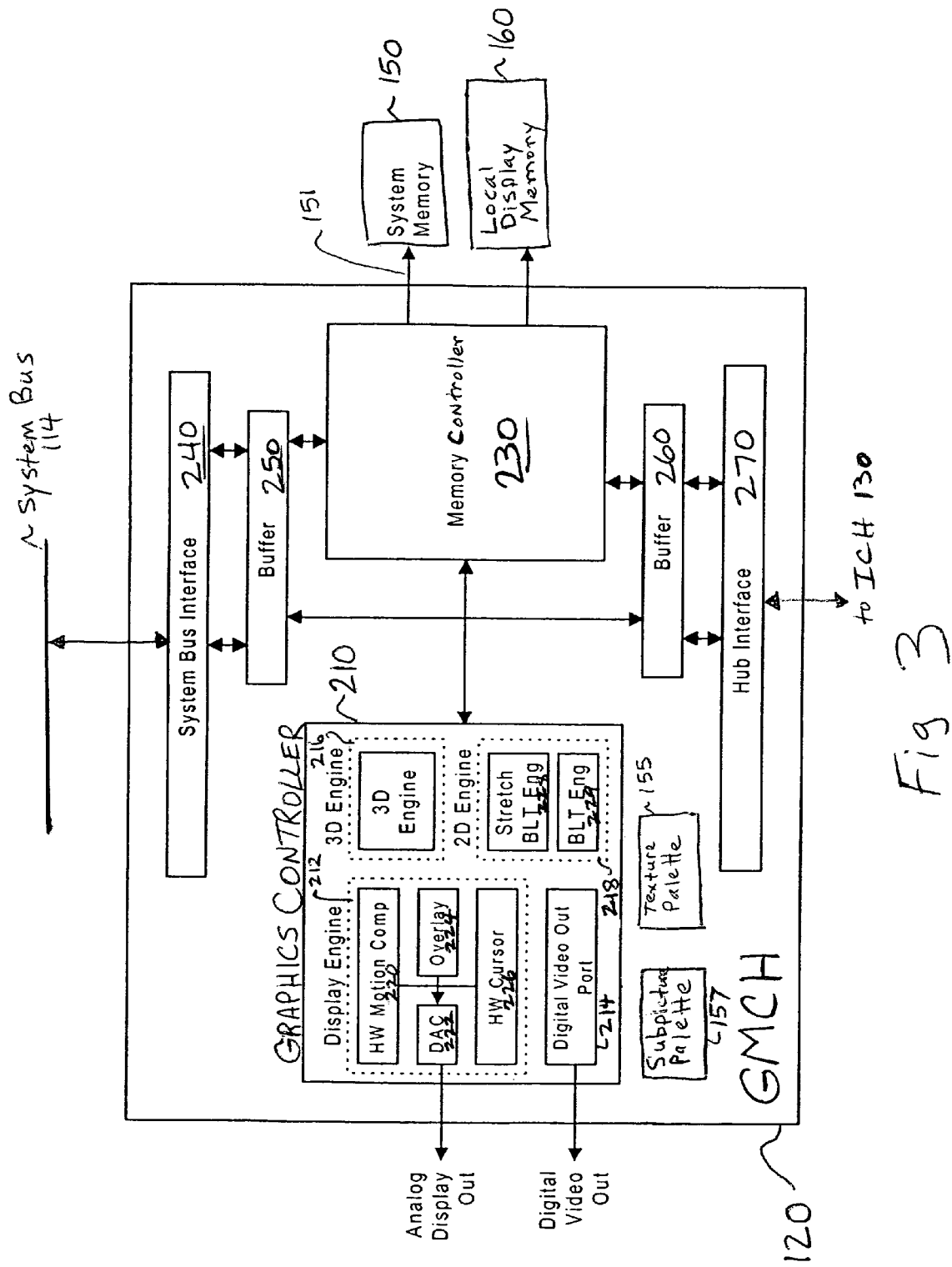
FIG. 3 is a block diagram illustrating a graphics and memory controller hub (GMCH) according to an example embodiment.

With the above overview of an example system have been given, discussion now turns more specifically to portions of the memory controller and/or graphics controller of the GMCH 120. FIG. 3 is a block diagram illustrating a graphics and memory controller hub (GMCH) 120 according to an example embodiment. The GMCH 120 includes a graphics controller 210 to provide graphics and video functions and a memory controller 230 to control and interface one or more memory devices to the system bus 114. Memory controller 230 is connected to the system bus via a buffer 250 and a system bus interface 240. The memory controller 230 is connected to the ICH 130 via a buffer 260 and hub interface 270.

As noted above, GMCH 120 is connected to a system memory 150 and a local display memory 160.

The display memory 160 (also commonly referred to as video or graphics memory typically provided on a video card or video memory card) is optional. In a lower cost embodiment known as a unified memory architecture (UMA), the local display memory 160 is not present in the computer system. Rather, in the UMA embodiment, the system memory 150 operates as both system memory and the local display memory. The UMA embodiment is less expensive because the cost for the separate local display memory 160 is saved. However, the bandwidth or data rate over the bus 151 between the GMCH 120 and the system memory 150 is typically very limited. As a result, the UMA embodiment presents technical challenges to provide adequate graphics or video performance while using only the bandwidth-limited system memory 150 for storing and processing video frames for display.

The graphics controller 210 of GMCH 120 includes a display engine 212 for displaying video or graphics images, a digital video output port 214 for outputting digital video signals, a 3D engine 216 for performing a variety of 3D graphics functions and a 2D engine 218 for performing 2D functions. The 3D engine 216 performs a variety of functions including texture mapping, bilinear and anisotropic filtering, MIP mapping, gouraud shading, alpha-blending, fogging and Z-buffering. The 2D engine 218 includes a BLT engine 229 and a stretch BLT engine 228 and for performing fixed blitter and stretch blitter (BLT) operations, which refer to a block transfer of pixel data between memory locations. The display engine 212 includes a hardware motion compensation engine 220 for performing motion compensation (e.g., sub-stage 28 of FIG. 1). Overlay function 224 can perform a YUV to RGB color conversion, while DAC 222 can convert digital video to analog video signals.

A texture palette 155, also known as a color lookup table (CLUT) is stored in memory or buffers provided within GMCH 120. Texture palette 155 (and a palette in general) includes a table of colors that identifies a subset from a larger range of colors. A small number of colors in the palette 155 allows fewer bits to be used to identify the color or intensity of each pixel. Texturing is an operation performed for 3D content in which a pattern or texture is placed on the surface of a 3D polygon. The colors for the textures are identified as indices to the texture palette 155 (or CLUT).

A subpicture palette 157 is also provided for alpha-blending the subpicture signal. The subpicture pixel values use a subpicture palette 157. The pixels of the subpicture signal may provide indices to the subpicture palette 157 (or subpicture CLUT). The subpicture palette 157 then outputs the Y, U and V values of the subpicture based on the indices. Alternatively, the subpicture signal may provide the actual subpicture Y, U and V values (without use of a palette).

The alpha-blending of the subpicture with the digital video is an operation typically associated with DVD processing, while texturing is typically associated with 3D processing. In most cases, the computer system will not be performing both 3D texturing and alpha-blending at the same time (e.g., DVD videos and 3D games are not typically running at the same time on a computer system). As described in greater detail below, according to an advantageous embodiment of the invention, a single dual-purpose palette (such as texture palette 155) can be used as both a texture palette and a subpicture palette to save hardware and reduce costs.

The operation of the computer system illustrated in FIGS. 2 and 3 will be briefly described. A DVD player outputs an encoded DVD data stream to the ICH 130 via an IDE port (for example). As noted above, the DVD data stream includes multiple streams, including a digital video stream, an audio stream and a digital subpicture stream. The DVD data stream is routed from the ICH 130 to processor 112. A software driver being executed or run by processor 112 parses the DVD data stream into separate video, audio and subpicture streams for processing. The separate streams may be stored in system memory 150. Each stream includes a set of data and instructions or commands.

The video and subpicture streams are routed back to the GMCH 120 for processing. For the video and subpicture streams, the memory controller 230 identifies instructions or commands and routes them to the appropriate hardware unit(s) for processing. The GMCH supports an extensive set of instructions that control various video or graphics functions, including, display, 3D rendering/texturing, BLT operations, motion compensation and alpha-blending. Some instructions may instruct the GMCH to load a set of color codes or values into a palette, or to perform motion compensation on one or more blocks, to perform 3D operations, etc. The image or frame data (pixel data) is typically stored in the local display memory 160 (when present) or stored in the system memory 150 in the UMA embodiment.

III. Alpha-Blending

A. A Typical Single-Pass Alpha-Blend in 4:2:2 Format

As shown in FIG. 1, sub-stage 32 of the DVD video processing involves alpha-blending the digital subpicture signal with the YUV 4:2:2 digital video signal to produce a blended digital video signal. The alpha blending process involves using an alpha value for each pixel to generate a blended pixel. Each of the Y, U and V samples of the subpicture signal and the video signal are weighted based on the alpha value and then added together to obtain a new blended pixel. For example, for each of Y, U and V samples, a destination sample can be calculated, for example, as:

blended sample=(video sample)(1−alpha)+(subpicture sample)(alpha).

The alpha value is conceptually normalized between 0.0 and 1.0. If alpha is a four bit number, for example, alpha will be first normalized (or divided by 15). Thus, for a four bit alpha value, the alpha will range from 0/15 to 15/15.

In YUV 4:2:2 interleaved (or packed) format, the Y, U and V samples are interleaved. This alpha-blending is presently performed in a single pass in which the Y, U and V samples for each pixel are input, alpha-blended, color converted (YUV to RGB conversion), and then the new (blended and color converted) pixel is output for display. Thus, presently, the alpha-blending is performed in a single pass because Y, U and V samples are blended in parallel or at approximately the same time for each pixel in the frame (e.g., only one pass is used to process Y, U and V samples).

While single-pass alpha-blending in YUV 4:2:2 format can provide excellent quality, such an approach requires relatively complex and expensive hardware to perform. The single-pass approach requires extensive hardware because three separate streams of data (Y, U and V streams) must be input and processed in parallel. This may require, for example, three separate circuits for addressing memory buffers, three separate circuits for routing or inputting the three streams of data, and three different sets of temporary buffers for buffering the data during processing. In addition, to generate 60 frames per second, particularly if the images require additional resizing or scaling, a significant amount of data bandwidth may be required when using the 4:2:2 format (which is less compressed than YUV 4:2:0 format). Such a relatively high bandwidth requirement may be more troublesome in lower cost PC systems, such as a UMA architecture where the pixel data is stored in a system memory having a relatively low bandwidth.

B. An Example Embodiment of a Multi-Pass Alpha-Blend in 4:2:0 Format

According to an embodiment, alpha-blending is performed at render time using multiple passes preferably in a planar 4:2:0 format to simplify circuitry and reduce costs. By using multiple passes to blend video data provided in a planar format, the memory bandwidth can be more efficiently used because data can be more efficiently retrieved from memory in large chunks from contiguous memory locations, rather than switching between three different data streams/locations. The lower bandwidth requirements of performing the subpicture-blend (or alpha-blend) in 4:2:0 more efficiently uses memory bandwidth, thus, better enabling a lower cost UMA type of architecture. Also, the subpicture blending in a 4:2:0 format advantageously will require fewer computations than in 4:2:2 format because the 4:2:0 format is more compressed than 4:2:2 format.

The DVD subpicture digital stream provides a data array of 8-bit values specifying the subpicture pixels. Each 8-bit value in the subpicture data array includes a 4-bit index to a subpicture palette that is concatenated with a 4-bit alpha value. The alpha value indicates the degree of opacity of the subpicture pixel. Thus, the alpha value indicates a relative weighting of the subpicture sample and corresponding video sample to obtain a blended pixel. Thus, the subpicture data array uses an index to specify a Y value, a Cr value, a Cb value and an alpha index for each pixel. Because there is one luminance (Y) and two chrominance samples (Cr, Cb) per pixel specified for the subpicture, the subpicture signals are essentially provided in a YUV 4:4:4 format. In a traditional approach (e.g., see FIG. 5 described below), the subpicture palette contains only Y, Cr and Cb values (no alpha values are typically stored in the palette).

FIG. 5 is a diagram illustrating a subpicture palette 157 according to an example embodiment.

As shown in FIG. 5, the DVD specification specifies a 16 entry subpicture palette in which 4-bit indices 505 are used. Each of the indices specifies one of 16 palette values. Each palette value (or color code) includes an 8-bit Y value 510, an 8-bit Cr value 515 and an 8-bit Cb value 520 for use in alpha-blending.

Figure 4:
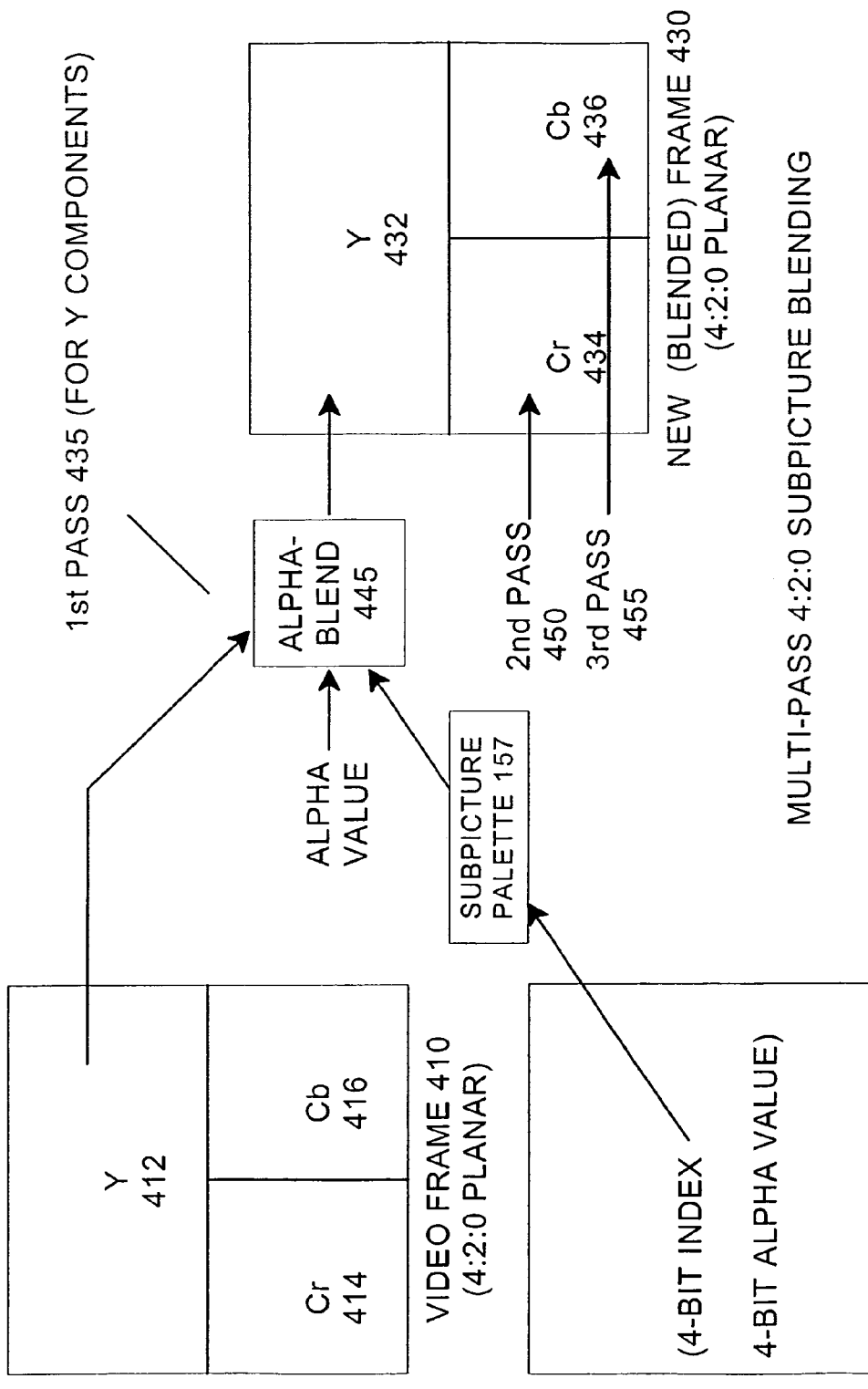
FIG. 4 is a diagram illustrating a multi-pass subpicture blending process according to an example embodiment of the invention.

FIG. 4 is a diagram illustrating a multi-pass subpicture blending process according to an example embodiment of the invention. According to an embodiment, three passes are performed to alpha-blend each frame to generate a new (blended) frame 430.

A digital video frame 410 is provided in which the samples or values are preferably stored in a YUV (or YCrCb) 4:2:0 planar format. As noted above, a planar format is where the Y, Cb and Cr values are stored in separate surfaces or memory buffers (rather than interleaved together as in interleaved or packed 4:2:2 format).

The Y values of the video frame 410 are stored in a Y surface 412, the Cr values of the frame 410 are stored in a Cr surface 414 and the Cb values of the frame 410 are stored in a Cb surface 416. These surfaces of video frame 410 typically have already undergone motion compensation prior to the alpha-blending. A subpicture data array 420 is provided and includes an array of subpicture data samples. Each 8-bit value in the subpicture data array 420 includes a 4-bit index to a subpicture palette 157 that is concatenated with a 4-bit alpha value. Although subpicture data array 420 may include many 8-bit values (for example, one 8-bit value for each pixel of a display), only one 8-bit value (index and alpha value) is shown in the subpicture data array 420 in FIG. 4.

The 4-bit index from the subpicture data array 420 is input to a subpicture palette 157, while the alpha value is input to an alpha-blend unit 445. Y values from the video frame 410 are input to the alpha-blend unit 445 for alpha-blending with the 8-bit subpicture values (output from the palette) based on the input alpha values.

According to an embodiment, in a first pass 435, each of the Y values of a frame (or picture, etc.) are alpha-blended and written to a new Y surface 432 of a new (blended) frame 430. This may be performed in a streaming fashion. This may be performed as follows. A Y value is output from the Y surface 412 of video frame 410 and is then input to alpha-blend unit 445. An 8-bit value (including a 4-bit index and a 4-bit alpha value) of the subpicture data array 420 (from the subpicture data stream) corresponding to the same pixel is output for processing. The index is input to the subpicture palette 157 and the alpha value is input to the alpha blend unit 445. Because the Y values are being processed on this first pass 435, the subpicture palette 157 outputs the 8-bit palette Y value 510 to the alpha blend unit 445. The alpha blend unit 445 blends the subpicture Y value 510 with the Y value from the video frame 410 based on the input alpha value, and outputs a blended Y value which is written to a Y surface 432 of a new (blended) frame 430 in planar YUV 4:2:0 format. This process is repeated for each of the Y values in the Y surface 412 of the video frame 410. In this manner, in the first pass 435, each of the Y values of the video frame 410 are blended and then written to a new Y surface 432 of a blended or new frame 430. The process for the first pass (to process the Y values) is illustrated in detail in FIG. 4.

In a second pass 450, each of the Cr values from a Cr surface 414 of video frame 410 is similarly alpha-blended and then written to a new Cr surface 434 of a new (blended) video frame (or picture) 430. The same subpicture data array 420 that was used for the Y blending process is also used for blending Cr values. During the second pass 450, the subpicture palette 157 outputs an 8-bit Cr palette value 515 (FIG. 5) corresponding to the 4-bit index.

In a third pass 455, each of the Cb values from a Cb surface 416 of video frame 410 is similarly alpha-blended and then written to a new Cb surface 436 of a new (blended) video frame (or picture) 430. The same subpicture data array 420 that was used for the Y blending process (first pass 435) and the Cr blending process (second pass 450) is also used for blending Cb values here in the third pass. Thus, during the third pass 455, the subpicture palette 157 outputs 8-bit Cb palette values 520 (FIG. 5) corresponding to the 4-bit indices.

The pixel data (YCrCb values) of the video frame 410 is provided in a 4:2:0 planar format, and is blended in 4:2:0 format using a multi-pass technique described above, and then stored in a 4:2:0 planar format as a new (blended) frame 430. As noted above, the subpicture pixel data is provided from the DVD data stream in essentially a 4:4:4 format. The video frame pixel data is provided in a 4:2:0 format (thus, only one pair of Cr, Cb values are shared for four pixels). To perform the alpha-blend in 4:2:0 format, only ¼ of the specified chrominance subpicture values will be used in alpha-blending. The remaining chrominance values from the subpicture may be simply discarded, known as decimation. Alternatively, better results can be achieved by using a filter or other conversion circuit to convert the 4:4:4 subpicture data to 4:2:0 format prior to blending.

According to an advantageous embodiment, the 4:2:0 multi-pass alpha blending is performed at render time (e.g., at the time the new frame is generated in memory), rather than at display time. According to an embodiment, alpha-blending in a 4:2:0 format at render time (e.g., at a refresh rate or 30 Hz or 60 Hz) requires far less bandwidth than a single pass 4:2:2 alpha-blending performed at display time (e.g., at 85 Hz).

Alpha-blending using a multi-pass technique as described above can be performed using less complex and less expensive hardware. Because only one data stream is processed at a time in the multi-pass approach, the circuitry can be simplified. For example, only one buffer, one input circuit, one addressing circuitry, etc. may be required to perform the alpha-blending process using the multi-pass technique described above. The same set of buffers, input circuitry, addressing circuitry can thus be used in each of the passes. Also, the same (subpicture) palette and alpha blend unit can be used for all three passes. By using multiple passes to blend video data provided in a planar format, the memory bandwidth can be more efficiently used because data can be retrieved large chunks from contiguous locations. Also, the subpicture blending in a 4:2:0 format advantageously will require fewer computations than blending in 4:2:2 format because the 4:2:0 format is more compressed than 4:2:2 format.

C. Another Example Embodiment of a Multi-Pass Alpha-Blend in 4:2:0 Format in which the Texture Palette is Used as a Subpicture Palette As noted above, the alpha-blending of the subpicture signal with the digital video signal is an operation typically associated with DVD processing, while texturing is typically associated with 3D processing. In most cases, the computer system will not be performing both 3D texturing and subpicture blending at the same time (e.g., DVD videos and 3D games are not typically running at the same time on a computer system). According to an advantageous embodiment of the invention, texture palette 155 can be also be used as a subpicture palette to save hardware and reduce costs.

Figure 6:
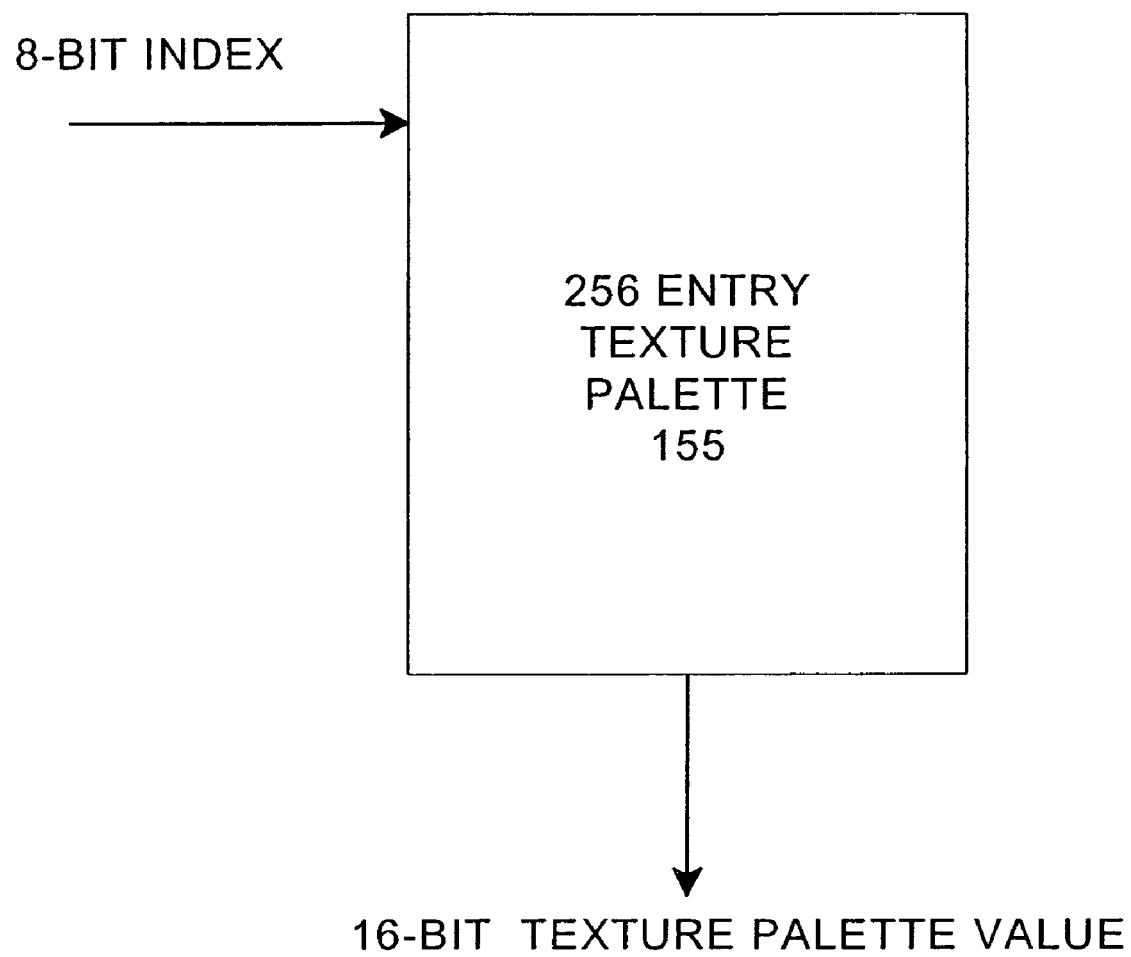
FIG. 6 is a block diagram illustrating operation of a texture palette according to an example embodiment.

FIG. 6 is a block diagram illustrating operation of a texture palette according to an example embodiment. Referring to FIG. 6, the texture palette 155 receives an 8-bit index, and selects for output one of 256 16-bit texture palette values. This illustrates only one example of a texture palette. Other sizes of texture palettes can be used. For example, a texture palette value that outputs 32-bit values may be used instead.

Figure 7:
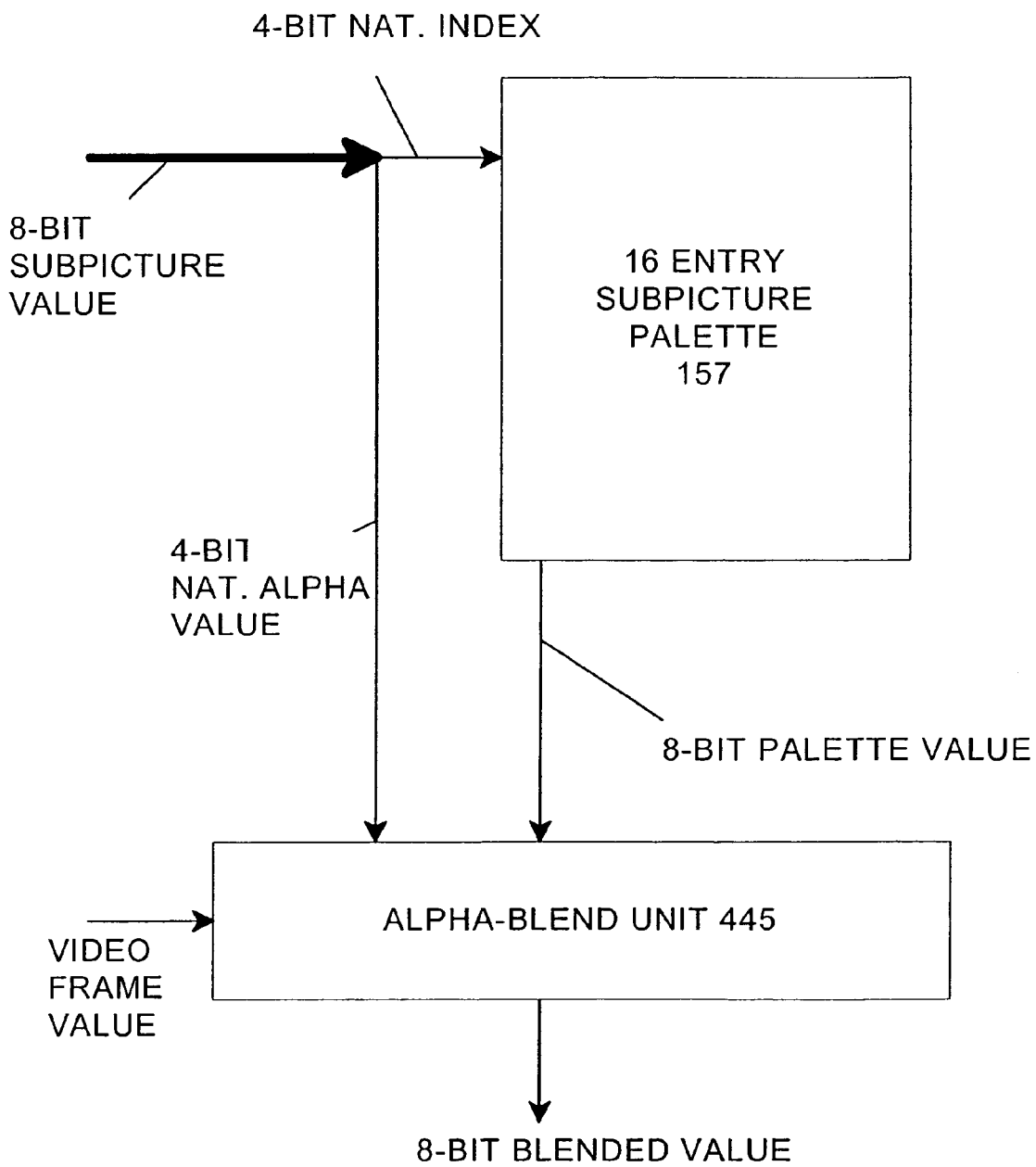
FIG. 7 is a block diagram illustrating operation of a subpicture palette according to an example embodiment.

FIG. 7 is a block diagram illustrating operation of a subpicture palette according to an example embodiment. In accordance with the DVD specification, the subpicture palette 157 receives a 4-bit (native) index, and selects and outputs one of sixteen 8-bit palette values. For FIGS. 7-9, the term native index will refer to the standard 4-bit (DVD compliant) subpicture index, and the term native alpha value will refer to the standard 4-bit (DVD compliant) alpha value. The alpha-blend unit 445 blends the 8-bit video frame value with the 8-bit palette value based on the native 4-bit alpha value to produce an 8-bit blended value.

According to an embodiment of the invention, the texture palette 155 is also used as the subpicture palette during subpicture alpha-blending. Each separate palette typically requires separate memory or buffers, and separate control and routing circuitry for routing data for input and outputs from the palette. However, if one palette is used for both a texture palette and a subpicture palette, then less hardware is used (e.g., the same memory of the palette, the same routing and control circuitry, etc.).

However, as shown in FIGS. 6 and 7, in a general case, the texture palette 155 is not the same size as the subpicture palette 157. In the example embodiments illustrated in FIGS. 6 and 7 (provided only for illustrative purposes), the subpicture palette receives a 4-bit index and outputs one of sixteen 8-bit palette values. On the other hand, the texture 155 palette receives an 8-bit index and outputs one of 256 16-bit palette values. Thus, the texture palette 155 includes more palette values, receives a larger index and outputs larger palette values than the subpicture palette 157.

In one embodiment, the 16 subpicture palette values are loaded into the texture palette 155 before each pass. The 16 Y values are loaded before the first pass, the Cr values are loaded prior to the second pass and the Cb values are loaded prior to the third pass. However, in this embodiment, only 16 of the 256 palette values are used, only 8 bits of the 16 bits of palette values are used, and only four bits of the 8-bit index are used (e.g., indices ranging from 00000000 to 00001111). Under such an arrangement, the different sized indices, and values, etc. may require the palette to operate in a different mode, which may require additional control or routing circuitry to allow one palette accommodate the two different-sized operating modes.

According to another embodiment, all 256 entries of texture palette 155 are used when operated as a subpicture palette. FIG. 9 is a diagram illustrating operation of the texture palette 155 as a subpicture palette according to an example embodiment. In order to avoid using a dedicated palette for subpicture blending, an existing texture palette can be loaded, for example, as shown in FIG. 9.

As shown in FIG. 9, each of the 8-bit palette indices 905 includes a 4-bit original (or native) index 910 concatenated with a corresponding 4-bit original (or native) alpha value 915. The 16-bit palette values 920 include a new (8-bit) alpha value 925 and an 8-bit subpicture value 930 (either Y, Cr or Cb). Each 4-bit native index value 910 is duplicated for 16 entries of the palette index, and then incremented. For each native index value 910, the native alpha value 915 ranges from 0000 to 11111 to provide 16 different palette indices for each native index (creating 256 indices total). Also, the new 8-bit alpha value 925 is created by rescaling the 4-bit native alpha value to an 8-bit alpha value. In one embodiment, to rescale the native 4-bit alpha value 915 to 8-bits, the native alpha value 915 can be multiplied by 255/16. According to an embodiment, a mathematical approximation of this rescaling is performed by replicating the native 4-bit native alpha value 915 in the upper 4-bits and the lower 4-bits to generate the new 8-bit alpha value 925. This is shown in the palette 155 of FIG. 9. Each of the 16 subpicture values 930 is duplicated for 16 entries in the palette 155 (e.g., during a first pass, subpicture value Y0 is provided for entries 0-15, Y1 is provided for entries 16-31, etc.)

The 16-bit outputs (palette values 920) of the palette in FIG. 9 each include both a subpicture value 930 (Y, Cr or Cb) and a native 4-bit alpha value which is expanded to 8 bits by replicating the 4-bit index. Because the 16 bit palette value 920 includes the native alpha value 915, it is not necessary in this embodiment to separately route or connect the 4-bit (native) alpha value to the blend unit 445, further reducing cost of the circuit. The 8-bit subpicture values 930 are reloaded into the palette in a same format as shown in FIG. 9 for each pass (e.g., Y subpicture values are loaded for a first pass, Cr values are loaded for a second pass and Cb values are loaded for a third pass). In this manner, a dedicated subpicture palette is unnecessary because the texture palette 155 is also used as the subpicture palette.

Figure 8:
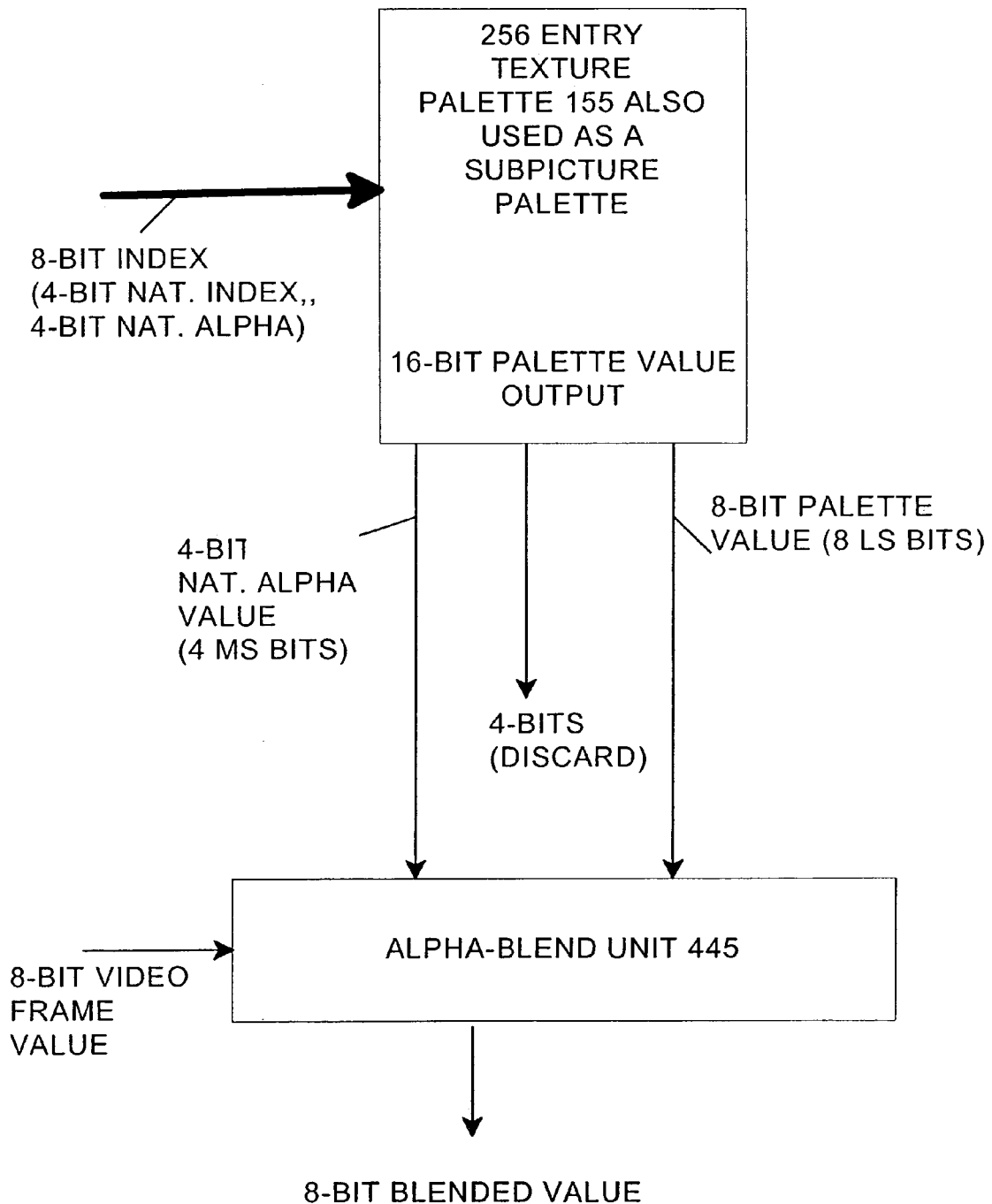
FIG. 8 is a diagram illustrating the operation of the texture palette when used as a subpicture palette according to an example embodiment.

FIG. 8 is a diagram illustrating the operation of the texture palette 155 when used as a subpicture palette according to an example embodiment. The texture palette 155 is loaded, for example, as shown in FIG. 9. Referring to FIG. 8, an 8-bit new index is received at the texture palette, including a 4-bit native index and a 4-bit native alpha value. Based on the received 8-bit index, the palette 155 outputs a 16-bit palette value, including an 8-bit palette value (e.g. a Y value for the first pass, a Cr value for the second pass and a Cb value for the third pass). As part of the 16-bit palette value, the palette 155 also outputs 8 bits including a 4-bit native alpha value (which is replicated in this example embodiment). Only 4 bits of the 8 bit alpha value is requires, allowing 4 of the 8 bits to be discarded as shown in FIG. 8. Based on the 4-bit native alpha value, the alpha blend unit 445 blends the 8-bit palette value with the 8-bit video frame value for the corresponding pixel. After all the Y values of a surface have been blended in the first pass, the subpicture values 930 in the texture palette 155 are reloaded with the 8-bit Cr values and the second pass is performed to alpha-blend the Cr values. After all the Cr values of a surface have been blended, the palette 155 is then reloaded with the Cb subpicture values. The Cb values of a surface are then blended in a third pass. The resulting 4:2:0 blended video frame may then be converted to other formats and resized as necessary for various display/recording devices. For example, the resulting 4:2:0 blended video frame may then be converted to a 4:2:2 format, and then from a 4:2:2 format to a 4:4:4 format. The 4:4:4 video frame may then be input to YUV to RGB color converters for color conversion. The RGB signal may then be output for display, recording, etc.

It should be noted that, in this particular example, it would be impractical to use the texture palette 155 as a subpicture palette if a single pass technique is used for subpicture alpha-blending because the palette value 920 of the texture palette 155 is only 16-bits wide. As a result, in this particular example, the texture palette 155 does not have sufficient width in the palette values 920 to provide the Y, Cr and Cb subpicture values at the same time require for a single pass alpha-blending technique (where Y, Cr and Cb values are processed in an interleaved or parallel fashion). However, use of the texture palette 155 for subpicture blending (as a subpicture palette) is possible according to the multi-pass alpha-blending technique because each of the Y, Cr and Cb surfaces are processed separately, allowing the palette 155 to be reloaded before each pass with the appropriate subpicture values 930.

Several embodiments of the present invention are specifically illustrated and/or described herein. However, it will be appreciated that modifications and variations of the present invention are covered by the above teachings and within the purview of the appended claims without departing from the spirit and intended scope of the invention.

What is claimed is:

1. A method of blending a subpicture signal and a video signal comprising:

receiving a subpicture signal, the subpicture signal providing a plurality of alpha values and information identifying or to identify a plurality of subpicture Y, U and V values;

receiving a video signal, the video signal including a set of Y values, a set of U values and a set of V values provided in a planar format;

blending, in a first pass, each of the Y values of the video signal with a corresponding Y value of the subpicture signal based on a corresponding alpha value to generate a set of blended Y values;

blending, in a second pass, each of the U values of the video signal with a corresponding U value of the subpicture signal based on a corresponding alpha value to generate a set of blended U values;

blending, in a third pass, each of the V values of the video signal with a corresponding V value of the subpicture signal based on a corresponding alpha value to generate a set of blended V values;

wherein the generated sets of blended Y values, U values and V values are provided in a planar format and the Y, U and V values of the video signal are provided in a 4:2:0 format, and wherein the steps of bending are performed using multiple passes in a 4:2:0 format.

2. The method of claim 1 wherein the step of receiving a subpicture signal comprises the step of receiving a subpicture signal, the subpicture signal including a plurality of alpha values and a plurality of palette indexes.

3. The method of claim 2 and further comprising the step of identifying subpicture Y, U and V values based upon the palette indexes.

4. The method of claim 3 wherein the step of identifying subpicture Y, U and V values based upon the palette indexes comprises the steps of:
  loading a palette with subpicture Y values, identifying one or more subpicture Y values based one or more indexes, and performing the step of blending each of the Y values in a first pass;
  loading a palette with subpicture U values, identifying one or more subpicture U values based one or more indexes, and performing the step of blending each of the U values in a second pass;
  loading a palette with subpicture V values, identifying one or more subpicture V values based one or more indexes, and performing the step of blending each of the V values in a third pass.

5. The method of claim 1 wherein the step of blending each of the Y values comprises the steps of:
  performing motion compensation on each of the Y values of the video signal; and
  blending each of the motion compensated Y values of the video signal with a corresponding Y value of the subpicture based on a corresponding alpha value to generate a set of blended Y values.

6. The method of claim 1 wherein the step of blending each of the U values comprises the steps of:
  performing motion compensation on each of the U values of the video signal; and
  blending each of the motion compensated U values of the video signal with a corresponding U value of the subpicture based on a corresponding alpha value to generate a set of blended U values.

7. The method of claim 1 wherein the step of blending each of the V values comprises the steps of:
  performing motion compensation on each of the V values of the video signal; and
  blending each of the motion compensated V values of the video signal with a corresponding V value of the subpicture based on a corresponding alpha value to generate a set of blended V values.

8. The method of claim 1 wherein the step of receiving a subpicture signal comprises the step of receiving a subpicture signal, the subpicture signal including a plurality of alpha values and a plurality of palette indexes:
  the method further comprising the steps of:
    loading a palette with subpicture Y values and identifying one or more subpicture Y values based upon one or more of the palette indexes prior to the step blending each of the Y values of the video signal;
    loading the palette with subpicture U values and identifying one or more subpicture U values based upon one or more of the palette indexes prior to the step blending each of the U values of the video signal; and
    loading the palette with subpicture V values and identifying one or more subpicture V values based upon one or more of the palette indexes prior to the step blending each of the V values of the video signal.

9. The method of claim 1 and further comprising converting the sets of blended Y values, U values and V values from a planar YUV 4:2:0 format to an interleaved YUV 4:2:2 format.

10. The method of claim 9 and further comprising the step of color converting the blended Y values: U values and V values from a YUV 4.2:2 format to a ROB format.

11. The method of claim 1 wherein said steps of blending are performed at render time.

12. The method of claim 1 wherein the video signal comprises a DVD video signal, and wherein the subpicture signal comprises a DVD subpicture signal.

13. A method of blending a subpicture signal and a video signal comprising:
  receiving a subpicture signal, the subpicture signal providing a plurality of subpicture values, each subpicture value including an alpha value and an index to a subpicture palette;
  receiving a video signal including a set of Y values, a set of U values and a set of V values, the sets of Y, U and V values being provided in a planar format;
  based on a corresponding alpha value, blending, in a first pass, each of the Y values of the video signal with a Y palette value referenced by a corresponding subpicture palette index to generate a set of blended Y values;
  based on a corresponding alpha value, blending, in a second pass, each of the U values of the video signal with a U palette value referenced by a corresponding subpicture palette index to generate a set of blended U values;
  based on a corresponding alpha value, blending, in a third pass, each of the V values of the video signal with a V palette value referenced by a corresponding subpicture palette index to generate a set of blended V values;
  wherein the sets of blended Y values, U values and V values being provided in a planar format, the Y, U and V values being provided in a 4:2:0 format, and blending is performed using multiple passes in a 4:2:0 format.

14. The method of claim 13 and further comprising the steps of:
  loading the subpicture palette with a plurality of subpicture Y palette values before performing the step of blending each of the Y values of the video signal;
  loading the subpicture palette with a plurality of subpicture U palette values before performing the step of blending each of the U values of the video signal; and
  loading the subpicture palette with a plurality of subpicture V palette values before performing the step of blending each of the V values of the video signal.

15. The method of claim 14 wherein the subpicture palette comprises a texture palette loaded with subpicture values for performing the steps of blending.

16. A circuit for blending video signals and subpicture signals comprising:
  a palette to output at least one subpicture value based on a palette index;
  an alpha-blend unit coupled to the subpicture palette to blend in a first pass, each of Y values of a video signal with a corresponding Y value of a subpicture signal based on a corresponding alpha value to generate a set of blended Y values, to blend, in a second pass, each of U values of the video signal with a corresponding U value of the subpicture signal based on a corresponding alpha value to generate a set of blended U values, and to blend, in a third pass, each of V values of the video signal with a corresponding V value of the subpicture signal based on a corresponding alpha value to generate a set of blended V values, wherein the generated sets of blended Y values, U values and V values being provided to the alpha-blend unit in a planar format, the Y, U and V values of the video signal are provided in a 4:2:0 format, and blending is performed using multiple passes in a 4:2:0 format.

17. The circuit of claim 16 wherein the palette is a dual-purpose palette which can operate as a texture palette or a subpicture palette.

18. The circuit of claim 17 wherein the palette, when operating as a subpicture palette includes indices based upon a native index and a native alpha value.

19. The circuit of claim 16 and further comprising a motion compensation circuit for motion compensating each of the luminance and chrominance values of the video signal prior to being blended with the subpicture signal.

20. A circuit for blending video signals and subpicture signals comprising:
 a subpicture palette to output at least one subpicture value based on a palette index;
 an alpha-blend unit to blend a set of subpicture Y values output from the subpicture palette with corresponding Y values of a video signal in a first pass, to blend a set of subpicture U values output from the subpicture palette with corresponding U values of the video signal in a second pass and to blend a set of subpicture V values output from the subpicture palette with corresponding V values of the video signal in a third pass, the Y, U and V values of the video signal being provided to the alpha-blend unit an a planar format, the Y, U and V values of the video signal being provided in a 4:2:0 format, and blending is performed using multiple passes in a 4:2:0 format.

* * * * *